United States Patent [19]

McLaughlin

[11] 4,089,132
[45] May 16, 1978

[54] SWINGING INSECT TRAP

[76] Inventor: Charles S. McLaughlin, 181 Grove St., Cambridge, Mass. 02138

[21] Appl. No.: 728,143

[22] Filed: Sep. 30, 1976

[51] Int. Cl.² ............................................. A01M 3/04
[52] U.S. Cl. ................................................... 43/136
[58] Field of Search ................. 43/114, 115, 116, 117, 43/136

[56] References Cited

U.S. PATENT DOCUMENTS 1,225,556  5/1917  Allen ........................................ 43/114
1,623,006  3/1927  Hamborg et al. ....................... 43/136

FOREIGN PATENT DOCUMENTS 251,448  5/1926  United Kingdom ................... 43/136

Primary Examiner—Louis G. Mancene
Assistant Examiner—Robert P. Swiatek

[57] ABSTRACT

An insect trap comprising a receptacle having an inlet and sidewalls, the sidewalls being provided with a plurality of vents and having a viscous substance on the surfaces facing the longitudinal axis of the receptacle, the vents each being smaller than the inlet but having a total combined passage area which is sufficient to allow the passage of air therethrough without building up a pressure wave at the front of the receptacle when the trap is swung through the air.

4 Claims, 4 Drawing Figures

U.S. Patent  May 16, 1978  4,089,132
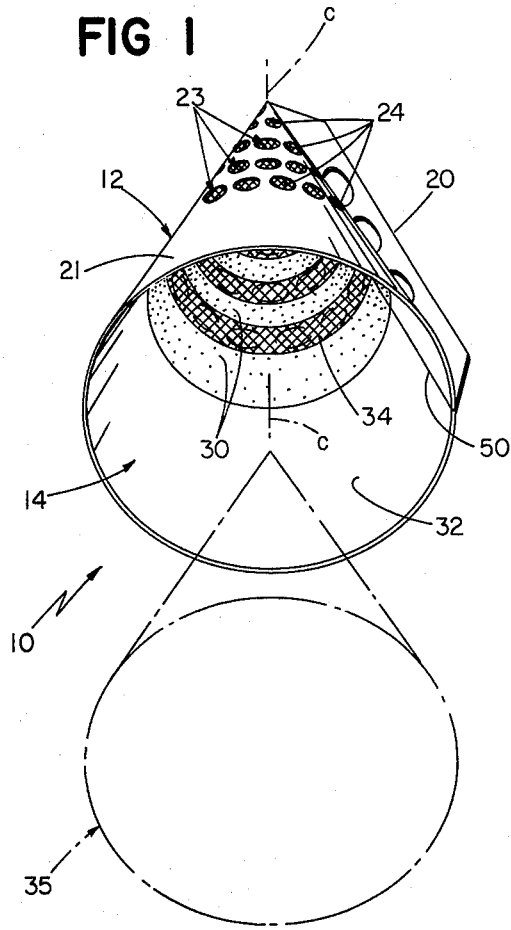
FIG 1
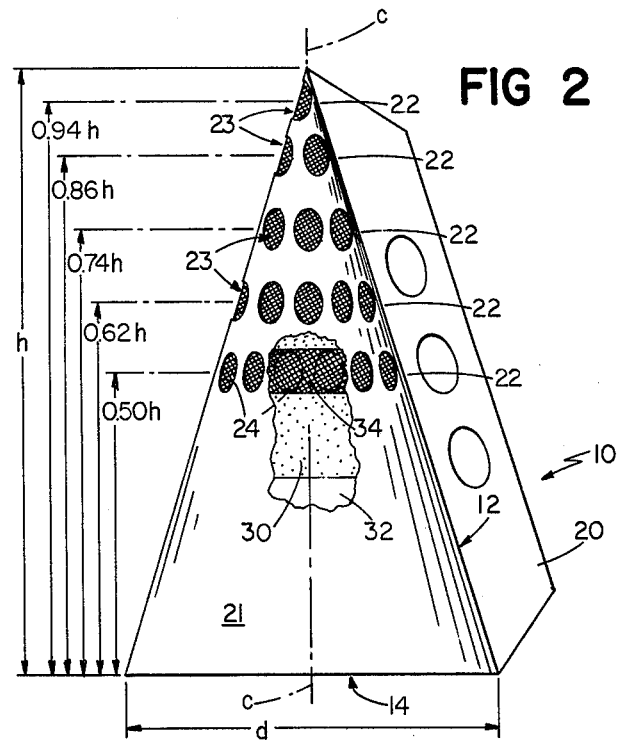
FIG 2
FIG 4
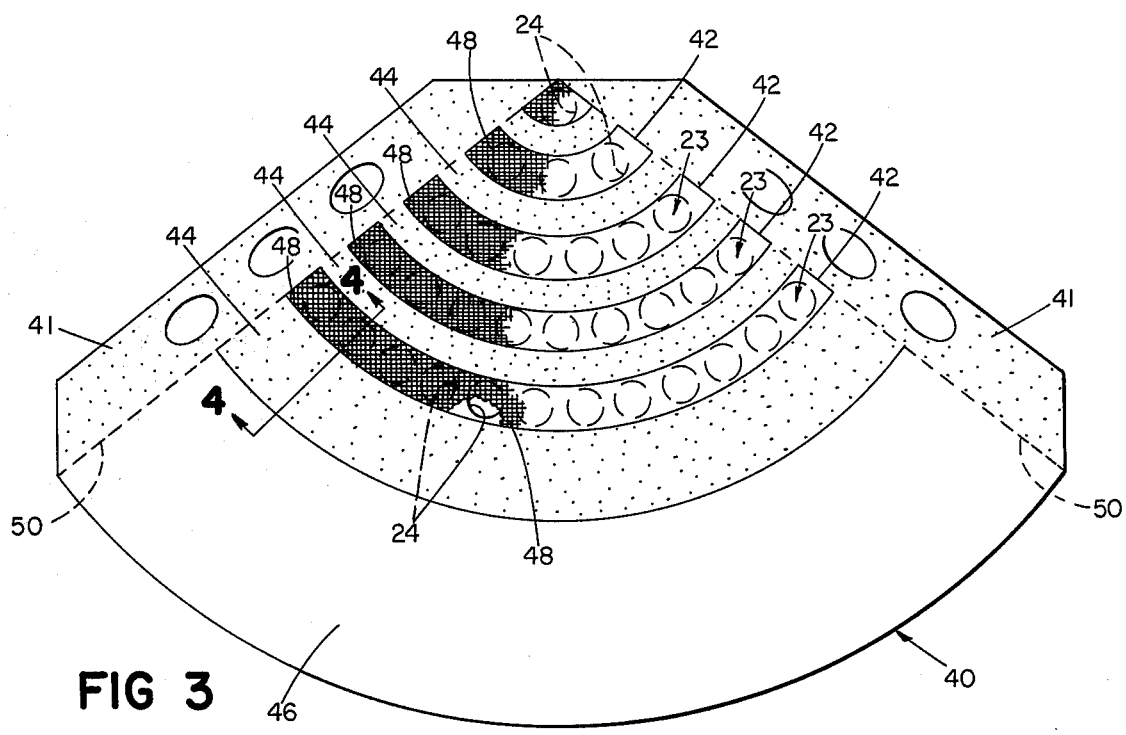
FIG 3

SWINGING INSECT TRAP

Background of the Invention

This invention relates to insect catchers.

Tschernitschek U.S. Pat. No. 1,521,261 shows a pyramid shaped insect catcher, open at its base, which is provided with a small vent at its apex and a coating of sticky material on the interior surface of its receptacle. Fowler U.S. Pat. No. 1,478,330 discloses a similar conically shaped receptacle which is mounted on a handle-frame. In Hamborg U.S. Pat. No. 1,623,006 a conical disc is provided with a plurality of vents in its sidewalls, the total vent area being shown small with respect to the receptacle inlet area.

I have found that a problem with such traps is that when swung through the air, they create flow patterns which are characterized by large pressure waves which build up at the front of the receptacles tending to push insects away from the receptacles rather than trapping them therein. It would be desirable to provide an insect trap which does not produce such a pressure wave when swung, but rather which tends to direct the insects towards its interior sticky walls, hence providing a more efficient trap.

Summary of the Invention

The invention provides a mobile, non-polluting, odorless insect trap which is simple, easy-to-construct, sturdy, reliable, inexpensive, and which efficiently traps insects and keeps them out of sight.

The invention features a receptacle having an inlet and sidewalls, the sidewalls being provided with a plurality of vents and having a viscous substance on the surfaces facing the longitudinal axis of the receptacle, the vents each being smaller than the inlet but having a total combined passage area which is sufficient to allow the passage of air therethrough without building up a pressure wave at the front of the receptacle when the trap is swung through the air. In preferred embodiments the receptacle is in the shape of a cone; the vents are spaced from the inlet of the receptacle at distances of at least one half the height of the receptacle; the vents are provided with screens; the vents have a total passage area which is at least 30% of the area of the trap inlet; the vents are circular and at least one-half inch in diameter; there are at least thirty vents; the vents are arranged in rows longitudinally spaced apart and surrounding the axis, the viscous substance being disposed between the rows; the receptacle is provided with an integral handle; and the receptacle has a height of at least seven inches and a base which is at least four inches across.

Other advantages and features of the invention will be apparent from the description and drawings herein of a preferred embodiment thereof.

Preferred Embodiment

Drawings

FIG. 1 is a bottom perspective view of the presently preferred embodiments of the invention with its packing insert removed and shown in phantom view;

FIG. 2 is a somewhat schematic side elevation partly broken away of the embodiment of FIG. 1;

FIG. 3 is a somewhat schematic developed view of the invention of the embodiment of FIG. 1; and FIG. 4 is a section taken along line 4—4 of FIG. 3.

Description

The presently preferred embodiment of the insect trap is indicated generally at 10.

Conical receptacle 12 having longitudinal axis $c$, height $h$, and diameter $d$ is open at its base to provide an inlet 14. The receptacle has an integral handle 20 and sidewall 21, which is provided with five rows 22 of vents 23 having a passage area 24; the rows being located at vertical distances of $0.50 \times h$, $0.62 \times h$, $0.74 \times h$, $0.86 \times h$, and $0.94 \times h$ above the base of the conical receptacle as shown in FIG. 2; the rows having twelve, nine, six, three, and one vents respectively. The receptacle is provided with sticky trap areas 30 on the interior surface of its sidewall adjacent the vents, and a non-sticky clean zone 32 which extends from the base of the trap a third of the way up the sidewall of the interior of the receptacle. The vents are provided with screens 34 which permit the flow of air, but prevent insects (e.g., houseflies) from passing therethrough. An insert 35 of non-adhesive paper is provided to allow traps to be stacked, without sticking to one another, for convenient shipping.

To construct trap 10, a blank 40 of stiff construction paper is cut to a shape, having gripping elements 41, as shown in FIG. 3. Circular holes are cut in the blank to provide arcs 42 of vents 23. One side of the blank is coated with a viscous material such as that used on conventional flypaper on the curved areas 44 adjacent the arcs 42; clean zone 46 is not coated. Strips of nylon mesh 48 are affixed over arcs 42. The blank is folded and fastened along seam 50 thereby forming conical receptacle 12 as shown in FIG. 1. Arcs 42 of vents 23, strips of mesh 48, curved areas 44, and clean zone 46 thereby form the rows 22 of vents, the screens 34, the trap areas 30, and the clean zone 32, respectively, of trap 10. Gripping elements 41 are fastened together to form integral handle 20.

Height $h$ is 8 inches; diameter $d$ is 5 inches; and the vents are circular holes one half inch in diameter; thereby providing a trap with the total vent passage area being approximately 30% of the area of the trap inlet.

In operation, insert 35 is discarded; the trap is gripped by handle 20, and swung, inlet first, over an insect which has alighted. The total vent area is large enough to allow the air in front of the moving trap to enter the receptacle and exit through the vents, without building up a pressure wave at the trap inlet, thus directing a large flow of air into the receptacle. The air exiting through the vents in the sidewall creates a flow pattern within the receptacle which is generally towards the apex or rear of the receptacle but which is characterized by large components transverse to the longitudinal axis $c$ of the receptacle and directed towards the trap areas. As the insect attempts to escape, it is caught within the air stream entering the trap inlet and is eventually thrown against a sticky trap area where it is caught. The mesh screens prevent an insect from escaping through a vent, and the generally rearwardly directed air flow prevents escape through the inlet. After the insect is caught, the trap is set on its base for storage, the trapped insect conveniently kept out of sight.

Other embodiments are within the following claims:

What is claimed is:

1. An insect catcher adapted to be manually swung through the air comprising a conically shaped receptacle having a longitudinal axis therethrough, said receptacle including an inlet which is intersected by said longitudinal axis, and sidewalls longitudinally extending from said inlet, said sidewalls being provided with a plurality of vents disposed therein, and having a coating of viscous substance on the surfaces spaced a substantial distance from said inlet and facing said longitudinal axis to provide a plurality of trap areas adjacent said vents, said vents each being smaller than said inlet and spaced therefrom by a distance of at least one-half the height of said receptacle, but having a total combined passage areas sufficient to allow the passage of air therethrough without the buildup of a pressure wave at said inlet when said receptacle is swung, and each of said vents being spaced from and being sized with respect to said inlet such that when said trap is swung, the passage of air through said vents creates an air flow generally directed into said receptacle and toward said trap areas.

2. The insect catcher of claim 1 wherein said vents have a total passage area which is at least 30% of the area of the trap inlet.

3. The insect catcher of claim 2 wherein said vents are arranged in rows longitudinally spaced apart and surrounding said axis, said viscous substance being in rows disposed only between said vent rows.

4. The insect catcher of claim 1 wherein said vents are provided with mesh screens and have a total passage area which is at least 30% of the area of the trap inlet.

* * * * *